US011033122B1

(12) United States Patent
Sulbaran (10) Patent No.: US 11,033,122 B1
(45) Date of Patent: Jun. 15, 2021

(54) BUFFET SERVING APPARATUS FOR PREVENTING AND SUBSTANTIALLY REDUCING SPREAD OF AIRBORNE VIRAL CONTAMINANTS, INCLUDING COVID-19 VIRUS

(71) Applicant: Guillermo Enrique Sulbaran, Lakeland, TN (US)

(72) Inventor: Guillermo Enrique Sulbaran, Lakeland, TN (US)

( * ) Notice: Subject to any disclaimer, the term of this patent is extended or adjusted under 35 U.S.C. 154(b) by 0 days.

(21) Appl. No.: 17/118,550

(22) Filed: Dec. 10, 2020

(51) Int. Cl.
*A47F 10/06* (2006.01)
*A47G 21/10* (2006.01)

(52) U.S. Cl.
CPC .............. *A47F 10/06* (2013.01); *A47G 21/10* (2013.01); *A47F 2010/065* (2013.01)

(58) Field of Classification Search
CPC .... A47F 10/06; A47F 13/08; A47F 2003/021; A47F 2010/065; A47J 45/02; A47J 43/283; A47G 21/10; B25J 11/0045
See application file for complete search history.

(56) References Cited

U.S. PATENT DOCUMENTS

| | | | | |
|---|---|---|---|---|
| 3,300,016 A * | 1/1967 | Simjian | ................... | A47B 63/02 194/210 |
| 4,889,263 A * | 12/1989 | Ellis | ........................... | A47F 1/03 222/185.1 |
| 5,240,150 A * | 8/1993 | Palmon | .................... | F25C 5/24 222/216 |
| 7,219,767 B1 * | 5/2007 | Steinbok | ................. | A47F 10/06 186/33 |
| 2008/0135711 A1 * | 6/2008 | Bunting | ................... | A47F 10/06 248/328 |
| 2008/0289188 A1 * | 11/2008 | Holdbrooks | ............ | A47J 45/02 30/123 |
| 2011/0193453 A1 * | 8/2011 | Matus, Jr. | ................ | A47F 10/06 312/140.4 |
| 2012/0119527 A1 | 5/2012 | Deitemeyer et al. | | |
| 2020/0101602 A1 * | 4/2020 | Bando | .................... | B25J 9/1612 |

FOREIGN PATENT DOCUMENTS

| | | | | |
|---|---|---|---|---|
| DE | 10318279 | 11/2004 | | |
| DE | 202004016892 | 1/2005 | | |
| WO | WO-9818370 A1 * | 5/1998 | ............. | A47F 10/06 |
| WO | WO-2018169043 A1 * | 9/2018 | .......... | B25J 11/0045 |

* cited by examiner

*Primary Examiner* — Dean J Kramer
(74) *Attorney, Agent, or Firm* — Hulsey P.C.

(57) ABSTRACT

Buffet serving apparatus including box-like structure having slots. The box-like structure receives a container holding a food product. The buffet serving apparatus includes a serving unit having an axle. The axle presents a food holder. The slots receive the axle. The axle moves/slides along the slots. The axle rotates in one direction to pick up food product from the container using the food holder and rotates in opposite direction to dispense the food product from the food holder. The serving unit includes a wheel/handle that connects to the axle. The wheel/handle helps move and rotate the axle to pick up and dispense the food product. The serving unit includes a motor configured to move and rotate the axle to pick up and dispense the food product. The buffet serving apparatus provides required hygiene and prevents contamination of food products and/or food holder, as may occur with the COVID-19 virus.

20 Claims, 12 Drawing Sheets

BUFFET SERVING APPARATUS FOR PREVENTING AND SUBSTANTIALLY REDUCING SPREAD OF AIRBORNE VIRAL CONTAMINANTS, INCLUDING COVID-19 VIRUS

FIELD OF THE INVENTION

The present invention generally relates to a food serving apparatus. More specifically, the present invention relates to a buffet serving apparatus for self-serving a food product without contacting a ladle or spoon by a diner, the buffet serving apparatus providing required hygiene and preventing contamination of the food product and/or the ladle from diners' breathe or exerted droplets, such as droplets containing the COVID-19 virus.

BACKGROUND OF THE INVENTION

A buffet is a system of serving meals in which food product or simply food is placed in a public area where diners serve themselves. Several containers are used to hold different type of foods. At times, lids are used to cover the food for serving the food hot and fresh. Further, food holders such as ladles or scoops or spoons are placed adjacent to the containers which the diners use to serve the food. The diners lift the lids and use the ladles to serve the food and put them back later. During this process, the diners may contaminate the food, lids or ladles with the air they breathe or with the exerted droplets from them.

Novel Coronavirus disease (COVID-19), which is an infectious disease caused by a newly discovered coronavirus became a global pandemic. Most people infected with the COVID-19 virus experience mild to moderate respiratory illness and recover without requiring special treatment. As the diners dine in restaurants, the chances of next diner getting infected in case a diner who approached the container was infected with COVID-19 becomes high. This poses a problem for diners to visit restaurants to have a meal. Even if they visit the restaurants, some diners may refuse to take the buffet fearing the food being contaminated as many diners come in contact with the food or lids or ladles.

One possible solution to overcome the above discussed problem is to provide a mechanism in which the diners do not touch or come in contact with the food, lids or ladles. Several attempts have been made in the past to provide such a mechanism.

For example, a device for removing or handling food product such as baked goods is disclosed in a German Patent Publication no. 202004016892 entitled "Hygienic serving unit used by customer to extract bakewares through opening, includes captive spoon running in slot and rear chute assembly" (the "'892 Publication"). The '892 Publication discloses a spoon that runs in a horizontal slot and solves the problem of cross contamination with a front plexiglass cover for the consumer to extract the goods without touching others. Also, the handle tool is used to pull the goods to the front. Once the goods are in the front they would fall in the chute and the final container.

Another example is disclosed in a United States Patent Publication No. 20120119527 entitled "Barbeque grilling utensil" (the "'527 Publication"). The '527 Publication discloses a barbeque grilling utensil that includes a shaft body, an internal shaft that is placed internally within the shaft body, an L-shaped actuation lever to movably secure the actuation lever to the shaft body and a spatula portion that is disposed on the shaft body that is controlled by the actuation lever.

Yet another example is disclosed in a German granted patent no. 10,318,279 entitled "Device for the manual removal of objects" (the "'279 Publication"). The '279 Patent discloses a device for manual removal of objects by means of a gripping element and a return mechanism.

Although the above-discussed disclosures disclose a mechanism to pick up a food product without the need for diners touching them, they have several limitations. For instance, they can be used only for pulling and manipulating dry products such as bread towards a front chute. However, they cannot be used to serve food at a buffet setting. In addition, above-discussed disclosures cannot be used when there is widespread of infectious disease such as COVID-19.

Therefore, there is a need for a buffet serving apparatus that helps to serve food without a diner coming in contact with the food and a food holder such as a spoon, provides required hygiene and prevents contamination of the food and/or the food holder from diners' breathe or exerted droplets.

BRIEF SUMMARY OF THE INVENTION

It is an object of the present invention to provide a buffet serving apparatus for serving food without a diner contacting food products and a food holder such as a spoon and avoids the drawback of known food serving mechanisms.

It is another object of the present invention to provide a buffet serving apparatus that provides required hygiene and prevents contamination of food products and/or a food holder from diners' breathe or exerted droplets.

It is another object of the present invention to provide a buffet serving apparatus for use in restaurants to serve buffet to multiple diners without having them to contact food products and/or a food holder used for serving the food products.

It is another object of the present invention to provide a buffet serving apparatus that can be operated manually or automatically.

It is yet another object of the present invention to provide a buffet serving apparatus that ensures diners to feel safe to dine during the times of infectious disease outbreaks such as Coronavirus disease (COVID-19).

In order to overcome the limitations here stated, the present invention provides a buffet serving apparatus that includes a box-like structure. The box-like structure provides a transparent material allowing diners to see food products placed inside the box-like structure. In one example, the box-like structure comes in a rectangular shape. The box-like structure encompasses slots extending substantially along the longer (horizontal) sides of the box-like structure. The box-like structure presents a cut-section at one end for receiving a plate or for serving the food products.

The buffet serving apparatus includes a serving unit. The serving unit provides an axle or elongated rod. The axle presents a food holder. The food holder indicates a spoon or ladle or scoop used for serving food products including solid, liquid, semi solid or semi-liquid food products. The slots receive the axle. In one embodiment, the serving unit includes at least one wheel that connects to the axle. A diner holds the at least one wheel and moves the axle along the slots. Further, the diner rotates the at least one wheel in one direction say clockwise direction to pick up the food product from the container using the food holder. Further, the diner moves the axle to a desired place and rotates the axle in opposite direction say anti-clock direction to dispense the food product from the food holder.

In one embodiment, the food holder includes a food tong. Further, the serving unit presents a second axle that connects to the at least one wheel. Here, the food holder connects to the second axle. In the present embodiment, the second axle includes a lever. Further, the food tong includes a scissor mechanism connecting the second axle. The diner engages the lever to hold or release the food product with the arms. Here, the diner holds the at least one wheel and moves the axle moves along the slots. Further, the diner rotates the at least one wheel to pick up and dispense the food product from the container using the food holder i.e., food tong.

In another embodiment, the serving unit includes a handle that connects to the axle. The diner holds the handle and moves the axle moves along the slots. Further, the diner rotates the handle to pick up and dispense the food product from the container using the food holder. In one example, the axle includes a tension spring facilitating the food holder to move left or right with respect to the axle within the box-like structure.

In another embodiment, the serving unit includes a motor that connects to the axle. The motor helps to move the axle along the slots. Further, the motor helps to rotate the axle to pick up and dispense the food product from the container using the food holder.

In one advantageous feature of the present invention, the diner holds the at least one wheel or the handle that positions at outer side of the box-like structure and operates the at least one wheel or the handle to serve the food product. In other words, the diner stands next to the box-like structure and operates the serving unit to serve the food product. As a result, droplets exerted or the air he/she breathe falls on the box-like structure and do not reach the food product or the food holder placed inside the box-like structure. This ensures that the food product and the food holder do not get contaminated with the air he/she breathes or droplets exerted from him/her.

In another advantageous feature of the present invention, the buffet serving apparatus facilitates serving the food products with the help of motors and avoids the diner to contact the at least one wheel or handle. This ensures diners do not come in proximity to the food product and the food holder.

Features and advantages of the invention hereof will become more apparent in light of the following detailed description of selected embodiments, as illustrated in the accompanying FIGUREs. As will be realized, the invention disclosed is capable of modifications in various respects, all without departing from the scope of the invention. Accordingly, the drawings and the description are to be regarded as illustrative in nature.

BRIEF DESCRIPTION OF THE DRAWINGS

The present invention will now be described in detail with reference to the drawings, which are provided as illustrative examples of the invention as to enable those skilled in the art to practice the invention. It will be noted that throughout the appended drawings, like features are identified by like reference numerals. Notably, the FIGUREs and examples are not meant to limit the scope of the present invention to a single embodiment, but other embodiments are possible by way of interchange of some or all of the described or illustrated elements and, further, wherein.

DETAILED DESCRIPTION OF THE EMBODIMENTS

The detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed buffet serving apparatus. However, it will be apparent to those skilled in the art that the presently disclosed invention may be practiced without these specific details. In some instances, well-known structures and devices are shown in functional or conceptual diagram form in order to avoid obscuring the concepts of the presently disclosed buffet serving apparatus.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention describes a buffet serving apparatus, it is to be further understood that numerous changes may arise in the details of the embodiments of the buffet serving apparatus. It is contemplated that all such changes and additional embodiments are within the spirit and true scope of this invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the invention and are not intended to limit the scope of the invention.

It should be understood that the present invention describes a buffet serving apparatus. The buffet serving apparatus includes a box-like structure having slots. The box-like structure receives a container holding a food product. The buffet serving apparatus includes a serving unit having an axle. The axle presents a food holder. The slots receive the axle. The axle moves or slides along the slots. The axle rotates in one direction to pick up the food product from the container using the food holder and rotates in opposite direction to dispense the food product from the food holder. In one example, the serving unit includes at least one wheel or handle that connects to the axle. The at least one wheel or handle helps to move and rotate the axle to pick up and dispense the food product. In one example, the serving unit includes a motor configured to move and rotate the axle to pick up and dispense the food product. The buffet serving apparatus provides required hygiene and prevents contamination of food products and/or a food holder used for serving the food products from diners' breathe or exerted droplets.

Various features and embodiments of a buffet serving apparatus are explained in conjunction with the description of FIGS. 1 to 12E.

Figure 1:
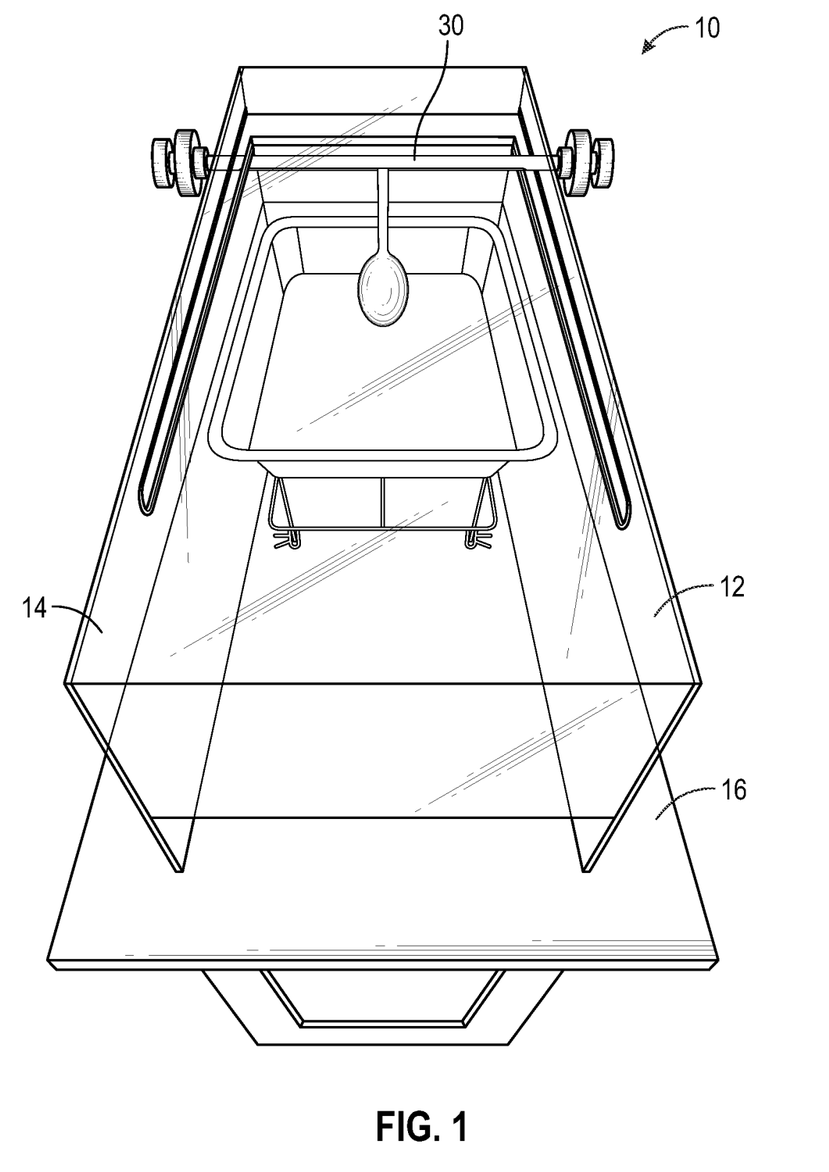
FIG. 1 illustrates an exemplary environment of a buffet serving apparatus placed on a table, in accordance with one embodiment of the present invention.
Figure 2:
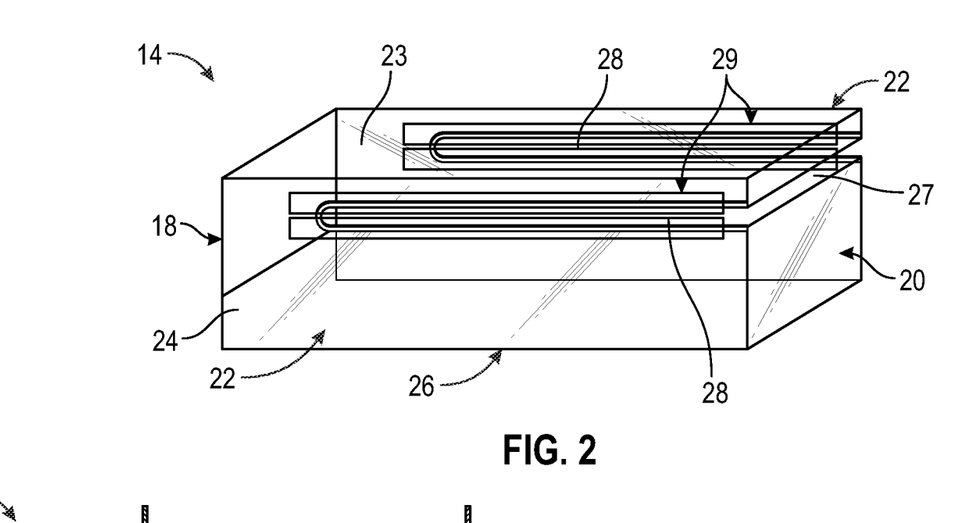
FIG. 2 illustrates a perspective view of a box-like structure.

In one embodiment, the present invention discloses a buffet serving apparatus. FIG. 1 shows an exemplary environment 10 of a buffet serving apparatus 12 placed on a table 16. Buffet serving apparatus 12 includes a box-like structure 14. FIG. 2 shows a perspective view of box-like structure 14, in accordance with one embodiment of the present invention. Box-like structure 14 comes in a variety of shapes such as rectangular, square or any other shape. In the current embodiment, box-like structure 14 comes in a rectangular shape with suitable height and depth. Box-like structure 14 provides a material made of plastic, glass or any other suitable material. In one example, box-like structure 14 encompasses a plexiglass or acrylic sheet. Further, box-like structure 14 comes in a transparent or semi-transparent material and allows to see-through contents stored inside box-like structure 14.

Box-like structure 14, is not part of the invention and has suitable strength and is resistant to heat and cold temperatures to show the food contents therein. Box-like structure 14 positions on a surface 16 such as a table or ground or any other structure. Box-like structure 14 includes a first end 18, a second end 20, sides 22 and a top 23. At the first end 18, box-like structure 14 encompasses a cut-section 24. Although it is shown that box-like structure 14 encompasses cut-section 24 at the bottom, person skilled in the art understands that cut-section 24 may situate at centre or off-centre or corners of first end 18. Further, person skilled in the art understands that cut-section 24 may come in different shapes and sizes depending on the need. First end 18, second end 20, sides 22 and top 23 present an opening 26 at the bottom of box-like structure 14. Box-like structure 14 includes a groove 27 extending entire length of second end 20. Further, box-like structure 14 encompasses slots 28 extending substantially or entire length of sides 22. As can be seen, slots 28 extend horizontally substantially or entire length of sides 22. Here, groove 27 and slots 28 position perpendicularly and have same width. In one implementation, slots 28 include a rubber cover 29 along the length of box-like structure 14. Rubber cover 29 seal slots 28 against airborne particles while in operation.

Figure 3:
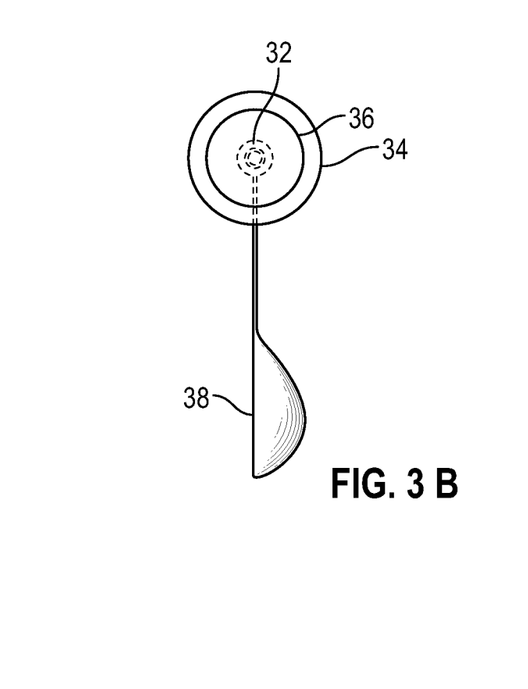
FIGS. 3A and 3B show a front and a side view of a serving unit, respectively.
Figure 3A:
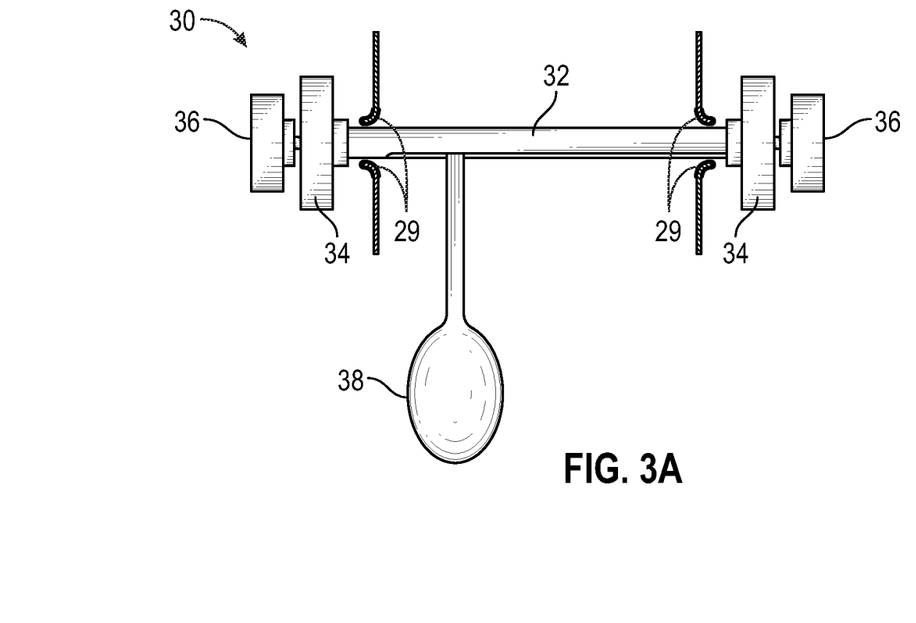

Buffet serving apparatus 12 includes a serving unit 30. Serving unit 30 connects to box-like structure 14 and helps to serve food products placed inside box-like structure 14 without direct contact from a diner. FIGS. 3A and 3B show a front and a side view of serving unit 30, respectively, in accordance with one embodiment of the present invention. Serving unit 30 presents an axle 32. Axle 32 indicates an elongated rod made of metal, plastic or any other suitable material. Axle 32 provides a first wheel 34 and a second wheel 36. Here, second wheel 36 positions at far ends of axle 32 and first wheel 34 positions adjacent to second wheel 36. Further, second wheel 36 is smaller in size when compared to first wheel 34. Each of first wheel 34 and second wheel 36 provides a material made of plastic, rubber, metal or any other suitable material. Each of first wheel 34 and second wheel 36 comes in a variety of shapes such as circular, square, rectangular or any other shape. In one example, first wheel 34 has a larger size or diameter compared to second wheel 36. Further, serving unit 30 encompasses a food holder 38 that mounts to axle 32, as shown in FIG. 3A. Food holder 38 includes, but not limited to, a spoon, a ladle, a scoop, or any other instrument used for serving food products. Food holder 38 comes in a variety of shapes depending on food product to be served.

Figure 4:
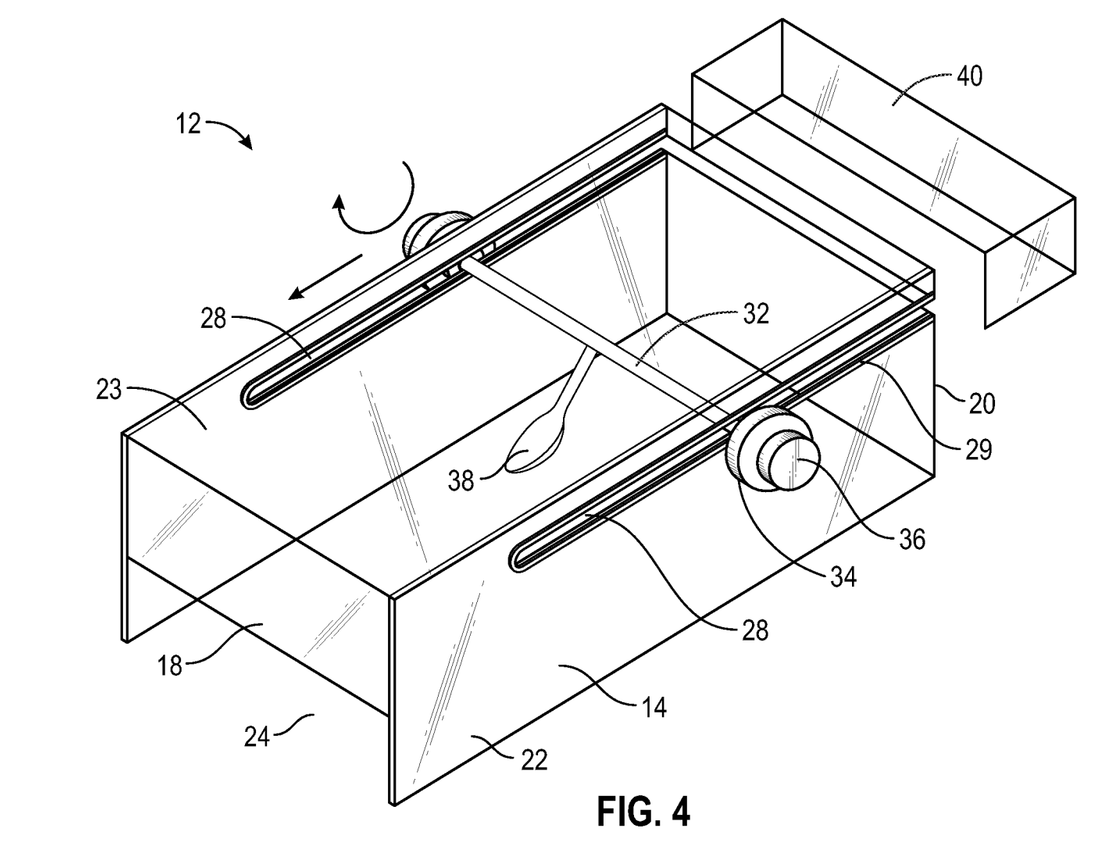
FIG. 4 shows a feature of the box-like structure having a cover.

Serving unit 30 mounts to box-like structure 14. Specifically, axle 32 draws through the groove 27 and enters slots 28 as shown in FIG. 4. Person skilled in the art understands that diameter of axle 32 is less than the width of groove 27 and slots 28 allowing it to easily slide or pass through groove 27 and slots 28. Buffet serving apparatus 12 further encompasses a cover 40 that mounts to box-like structure 14 at the corner i.e., at the edges of second end 20, sides 22 and top 23. Cover 40 helps to secure axle 32 within slots 28.

Figure 5:
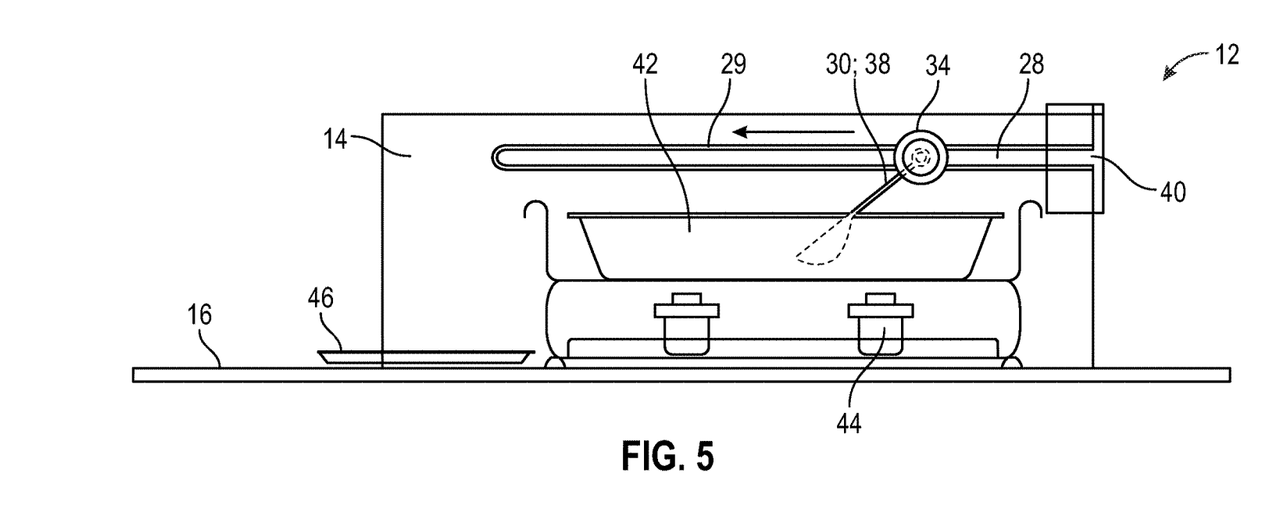
FIGS. 5 and 6 illustrate operation of the buffet serving apparatus.
Figure 6:
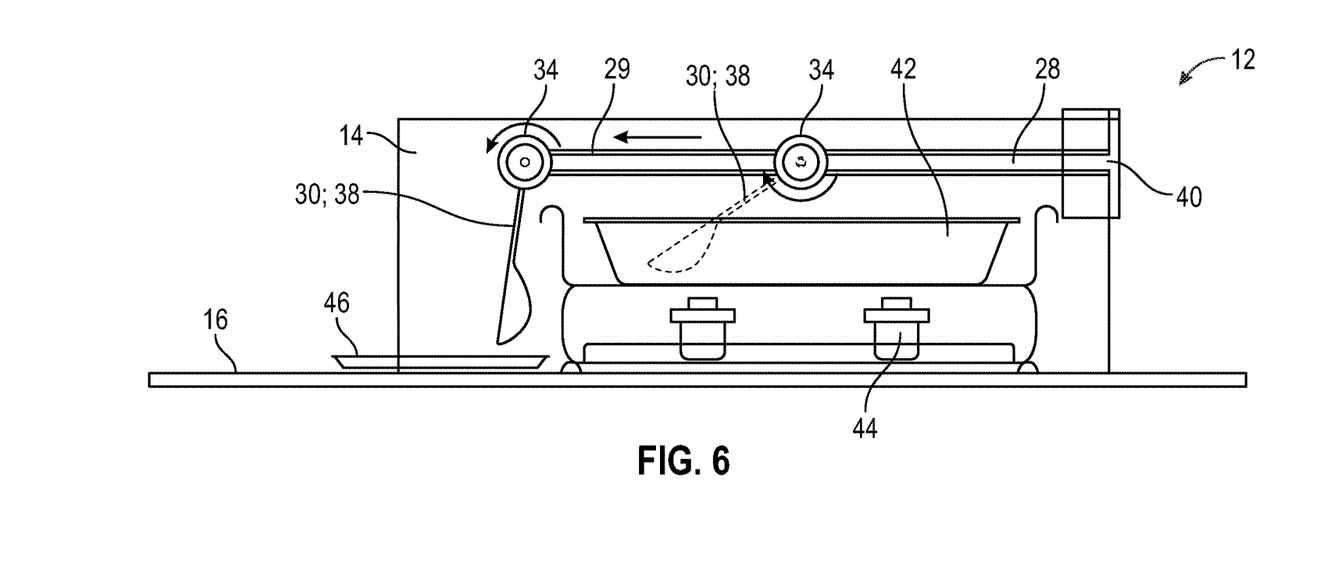

FIGS. 1, 5 and 6 show operational set-up of buffet serving apparatus 12, in accordance with one embodiment of the present invention. Specifically, FIGS. 1 and 5 show a front perspective and a side view of buffet serving apparatus 12, respectively. Here, buffet serving apparatus 12 includes a container 42 holding or storing food product(s) (not shown). Food product may include, but not limited to, solid, liquid, semi solid or semi-liquid food products. For example, food product may include pasta, meat, cut-fruits and vegetables or any other food item known in the art. In one example, container 42 provides a heater 44 placed underneath to maintain required temperature for the food product. Further, buffet serving apparatus 12 includes a plate 46 drawn through cut-portion 24 and placed on table 16 adjacent to container 42.

Operation of buffet serving apparatus 12 is explained using FIG. 6. As specified above, container 42 stores the food product. A diner (not shown) approaches buffet serving apparatus 12 and operates serving unit 30 to serve the food product in plate 46 without contacting the food product and food holder 38. Here, the diner approaches buffet serving apparatus 12 and places plate 46 through cut-portion 24. First wheel 34 mounts firmly to axle 32 and moves axle 32 back and forth in slots 28. First wheel 34 also lifts food holder 38 up and down. After approaching container 42, the diner rotates first wheel 34 and lifts the food product using food holder 38. In one example, the diner rotates first wheel 34 in clockwise direction to lift the food product using food holder 38. Further, the diner moves serving unit 30 above plate 46. Subsequently, the diner rotates first wheel 34 in anti-clockwise direction to place the food product in plate 46. After placing the food product in plate 46, the diner withdraws plate 46 away from the box-like structure 14. Further, the diner moves serving unit 30 towards second end 22, as shown in FIG. 5.

Second wheel 36 moves food holder 38 to the left or to the right of container 42 to place food holder 38 within the range of the food. Upon rotating the rod inside axle 32, a spring (not shown, e.g., FIG. 8) inside displaces food holder 38 left or right. Although it is explained that second wheel 36 helps to move serving unit 30 along slots 28 and first wheel 34 helps to rotate serving unit 30 (and food holder 38), a person skilled in the art understands that a single wheel, i.e., first wheel 34 or second wheel 36 allows the diner to slide along slots 28 and rotate serving unit 30 to serve the food product as explained above. Buffet serving apparatus 12 allows right or left-handed diner to serve the food product without contacting or touching the food product and food holder 38.

Figure 7:
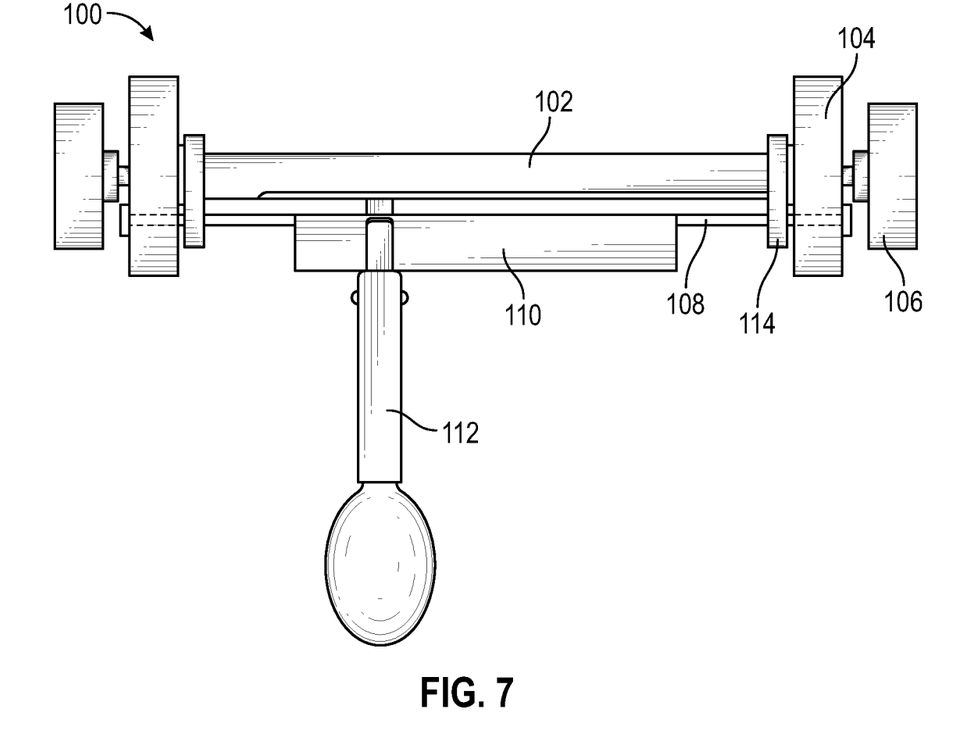
FIGS. 7 and 8 illustrate exemplary embodiments of a serving unit that allow for use with the buffet serving apparatus.

FIG. 7 shows a serving unit 100 that allows for use with buffet serving apparatus 12 (FIG. 1), in accordance with another embodiment of the present invention. Serving unit 100 presents a first axle 102. First axle 102 indicates an elongated rod made of metal, plastic or any other suitable material. First axle 102 provides a first wheel 104 and a second wheel 106. Here, second wheel 106 positions at far ends of first axle 102 and first wheel 104 positions adjacent to second wheel 106. Further, second wheel 106 is smaller in size when compared to first wheel 104. Each of first wheel 104 and second wheel 106 provides a material made of plastic, rubber, metal or any other suitable material. Each of first wheel 104 and second wheel 106 comes in a variety of shapes such as circular, square, rectangular or any other shape. In one example, first wheel 104 comes in a larger size or diameter compared to second wheel 104. Further, serving unit 100 includes a second axle 108 that mounts to first wheel 104. Second axle 108 mounts parallelly to first axle 102. In one example, second axle 108 has a smaller diameter compared to first axle 102.

In one example, second axle 108 presents a support plate 110. First axle 102 encompasses a food holder 112 such as a spoon or ladle. Support plate 110 helps to open or close food holder 112. As explained above, food holder 112 moves to the right or left. Support plate 110 operates food holder 112 all the way along first axle 102. Further, serving unit 100 provides a lever 114 that mounts to second axle 108. In accordance with current embodiment, first axle 102 and second axle 108 draw through the groove 27 and rest in slots 28 as explained above. Here, a diner holds second wheel 106 and moves serving unit 100 towards first end as explained above. Subsequently, the diner rotates first wheel 104 to lift the food product using food holder 112. Here, the diner rotates first wheel 104 in clockwise direction to lift the food product using food holder 112. In one example, the diner operates lever 114 to control the angle support plate 110 and close food holder 112 to grip the food product. A diner operates lever 114 and rotates first wheel 104 to lift the food product and bring it to the front. Further, the diner rotates first wheel 104 again above the plate (e.g., plate 46 in FIG. 6) and releases lever 114 to release the grip of food holder 112 and dispense the food product in the plate.

Figure 8:
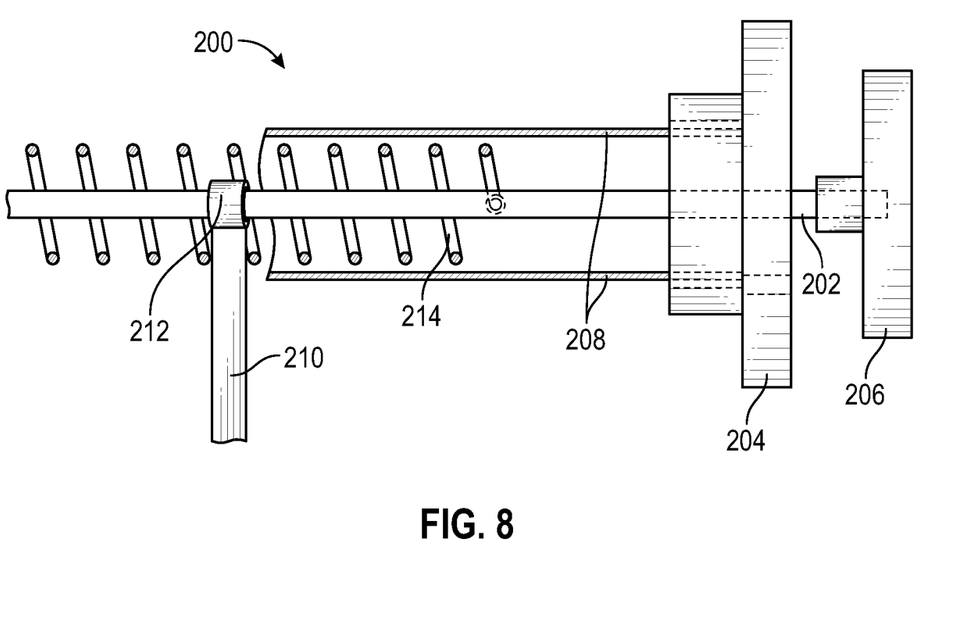

FIG. 8 shows a serving unit 200 that allows for use with buffet serving apparatus 12 (FIG. 1), in accordance with another embodiment of the present invention. Serving unit 200 presents a first axle 202. First axle 202 indicates an elongated rod made of metal, plastic or any other suitable material. First axle 202 provides a first wheel 204 and a second wheel 206. Here, second wheel 206 positions at far ends of first axle 202 and first wheel 204 positions adjacent to second wheel 206. Further, second wheel 206 is smaller in size when compared to first wheel 204. Each of first wheel 204 and second wheel 206 provides a material made of plastic, rubber, metal or any other suitable material. Each of first wheel 204 and second wheel 206 comes in a variety of shapes such as circular, square, rectangular or any other shape. In one example, first wheel 204 comes in a larger size or diameter compared to second wheel 206. Further, serving unit 200 includes a pair of second axles 208 that mount to first wheel 204. Second axles 208 mount parallelly to first axle 202. In one example, second axles 208 has a smaller diameter compared to first axle 202.

In the current embodiment, first axle 202 presents a food holder 210. Here, food holder 210 mounts to first axle 202 via a connector 212. Further, serving unit 200 encompasses spring 214 that mount to first axle 202 and between second axles 208. Here, when a diner rotates second wheel 206, spring 214 allow to shift position of food holder 210 allowing it to move left or right within the box-like structure 14 to pick up and serve food as explained above.

Figure 9A:
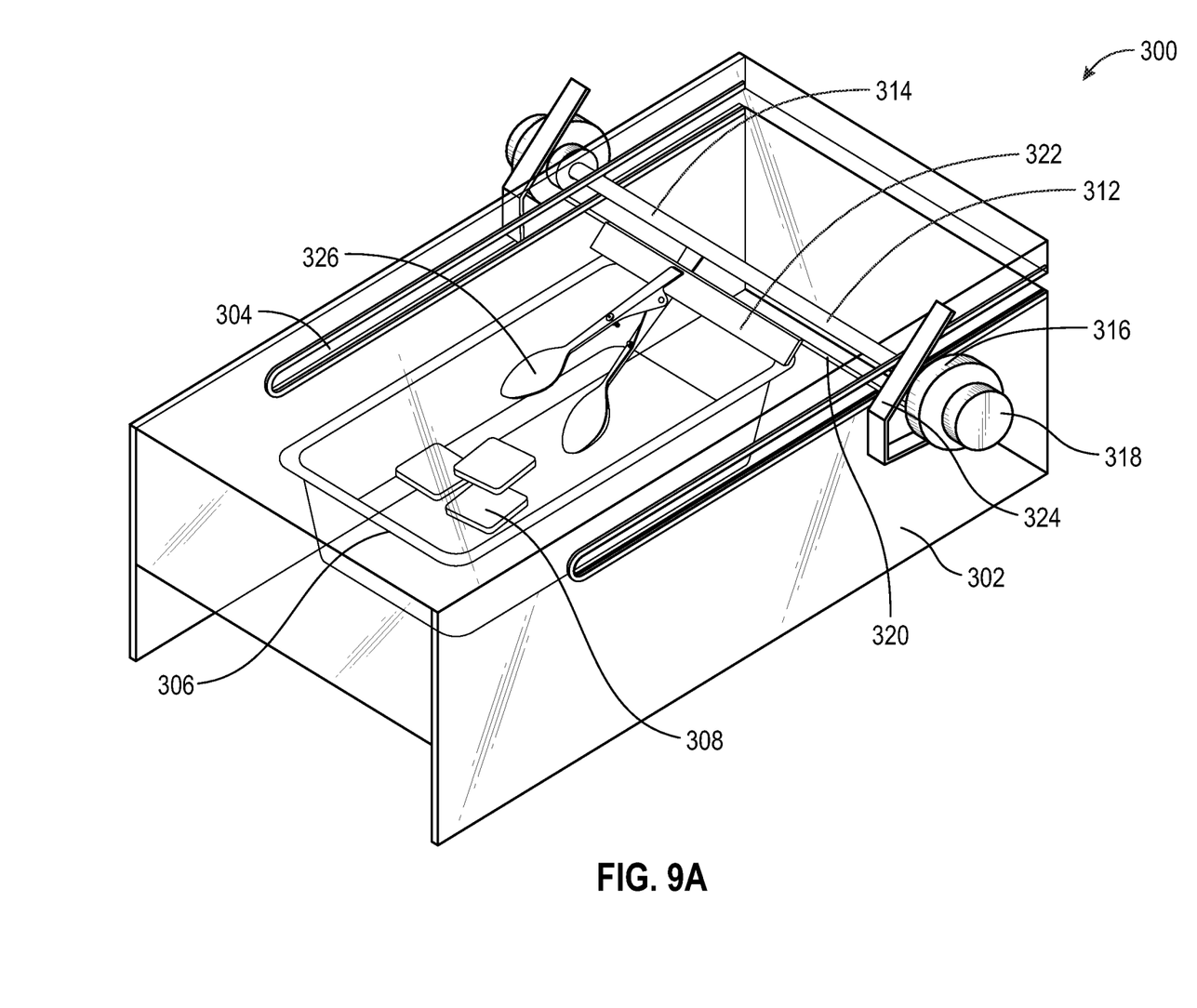
FIGS. 9A through 9C illustrate a buffet serving apparatus, in accordance with another embodiment of the present invention.
Figure 9B:
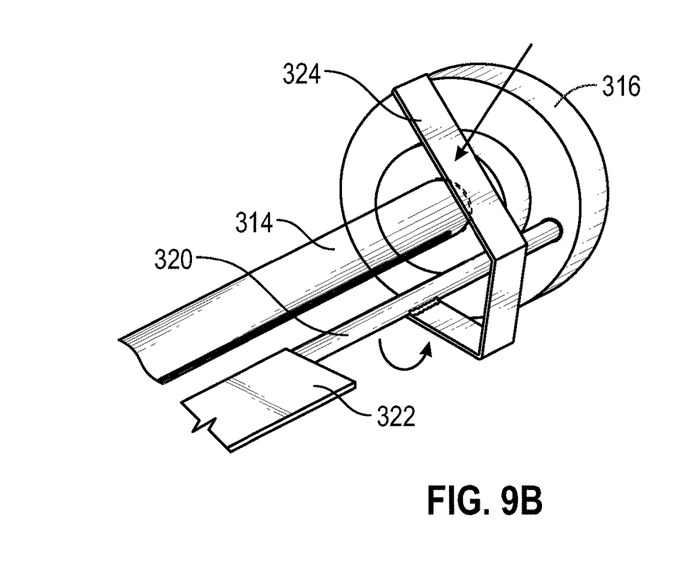
Figure 9C:
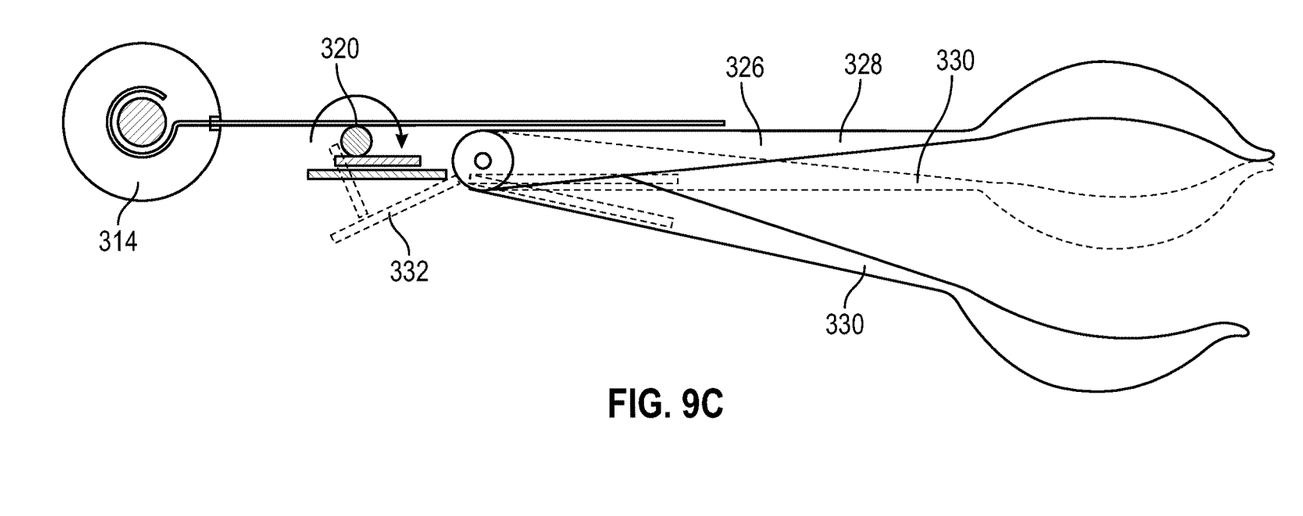

FIGS. 9A, 9B and 9C show a front perspective, a side perspective and a side view of a buffet serving apparatus 300, respectively in accordance with yet another embodiment of the present invention. Buffet serving apparatus 300 includes a box-like structure 302 having horizontal slots 304. In the current embodiment, box-like structure 302 receives a container 306 for storing food products 308. In one example, food products 308 include, but not limited to, bread slices, bakery products and so on. In the current embodiment, buffet serving apparatus 300 includes a serving unit 312. Serving unit 312 presents a first axle 314. First axle 314 indicates an elongated rod made of metal, plastic or any other suitable material. First axle 314 provides a first wheel 316 and a second wheel 318. Here, second wheel 318 positions at far ends of first axle 314 and first wheel 316 positions adjacent to second wheel 318. Further, second wheel 318 is smaller in size when compared to first wheel 316. Each of first wheel 316 and second wheel 318 provides a material made of plastic, rubber, metal or any other suitable material. Each of first wheel 316 and second wheel 318 comes in a variety of shapes such as circular, square, rectangular or any other shape. In one example, first wheel 316 comes in a larger size or diameter compared to second wheel 318. Further, serving unit 312 includes a second axle 320 that mounts to first wheel 316. Second axle 320 mount parallelly to first axle 314. In one example, second axle 320 has a smaller diameter compared to first axle 314.

Second axle 320 presents a actuator plate 322. Further, serving unit 312 provides a lever 324 that mounts to second axle 320. Main axel 312 provides a food holder 326. Food holder 326 rides along the length of actuator plate 322. Here, food holder 326 includes a food tong or a kitchen tong. Food holder 326 encompasses arms i.e., a first arm 328 and a second arm 330. In one example, first arm 328 acts a fixed part and second arm 330 acts a moving part for holding and releasing the food product 308. In order to hold or release food product 308, food holder 326 presents a scissor mechanism 332 that mounts beneath second axle 320 and connects to first arm 328 and second arm 330, as shown in FIG. 9C. Here, a diner holds first wheel 316 while pressing lever 324 and moves serving unit 312 towards first end as explained above. Subsequently, the diner operates lever 324 to hold and release the food product 308. Here, the diner rotates first wheel 316 and reaches the food product 308 with free ends of arms. Subsequently, the diner adjusts or presses lever 324 thereby bringing first arm 328 and second arm 330 closer to hold the food product. Further, the diner operates first wheel 316 to move serving unit 312 towards plate placed at the first end as explained above. After reaching, the diner rotates the first wheel 316 to bring food holder 326 closer to the plate. Subsequently, the diner releases pressure on lever 324 separating first arm 328 and second arm 330 to dispense the food product 308 into the plate. Person skilled in the art understands that operating (pressing or releasing) lever 324 engages scissor mechanism 332 which in turn engages first arm 328 and second arm 330 to hold or release food product 308 (FIG. 9C).

Figure 10A:
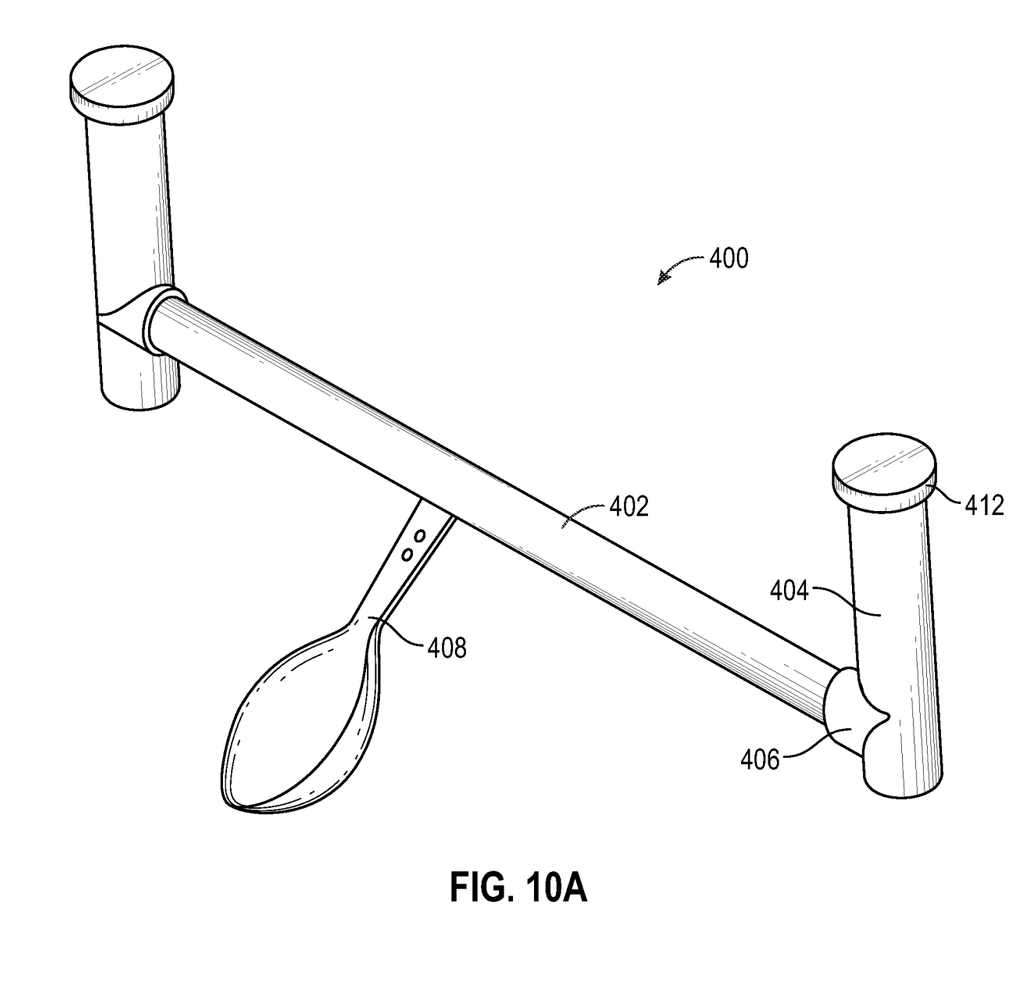
FIGS. 10A, 10B and 11 illustrate exemplary embodiments of a serving unit that allow for use with the buffet serving apparatus.
Figure 10B:
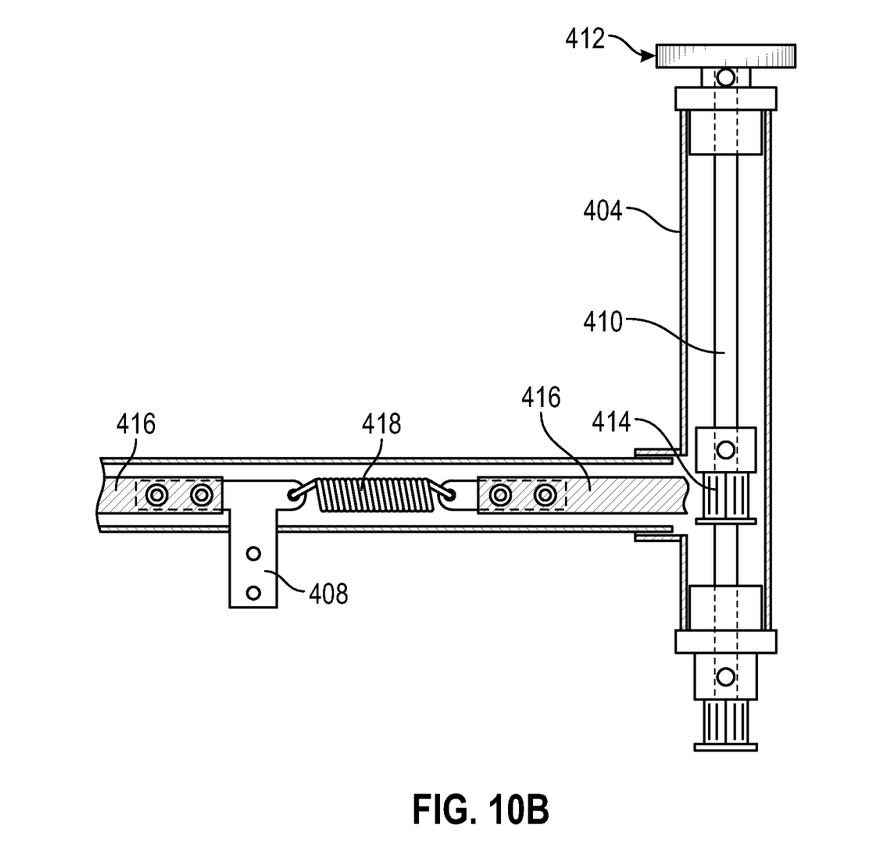

FIG. 10A shows a perspective view of a serving unit 400, in accordance with yet another embodiment of the present invention. Serving unit 400 encompasses an axle 402. Axle 402 connects to a handle 404 via a coupler 406. Further, axle 402 presents a food holder 408 for holding food temporarily and then serving food. In the current embodiment, axle 402 draws through groove 27 and operatively rests in slots 28 as explained above. Here, a diner holds handle 404 and operates serving unit 400 to serve food. FIG. 10B shows internal mechanism of axle 402 and handle 404 facilitating operation of serving unit 400 in box-like structure 14 for serving food product without having contact. In the current embodiment, handle 404 includes a rod 410. Rod 410 presents a positioner 412 allowing the diner to place his/her finger and rotate. Rotating positioner 412 rotates rod 410. Further, rod 410 includes a connector 414. Connector 414 connects to a timing belt 416. Timing belt 416 connects to a tension spring 418 which in turn connects to food holder 408.

In operation, the diner turns positioner 412 to move food holder 408 left or right within the box-like structure 14 as explained above. Here, turning positioner 412 turns connector 414. In turn, the connector 414 engages tension spring 418 through the timing belt 416. Tension spring 418 extends or contracts to move farther or closer from one side to another (sides 22 in FIG. 2). In other words, tension spring 418 extends or contracts allowing food holder 408 to move left or right within box-like structure 14. Further, the diner holds handle 404 to slide or move axle 402 along slots 28 as explained above. Additionally, the diner rotates handle 404 to lift or dispense food product with the help of food holder 408.

Figure 11:
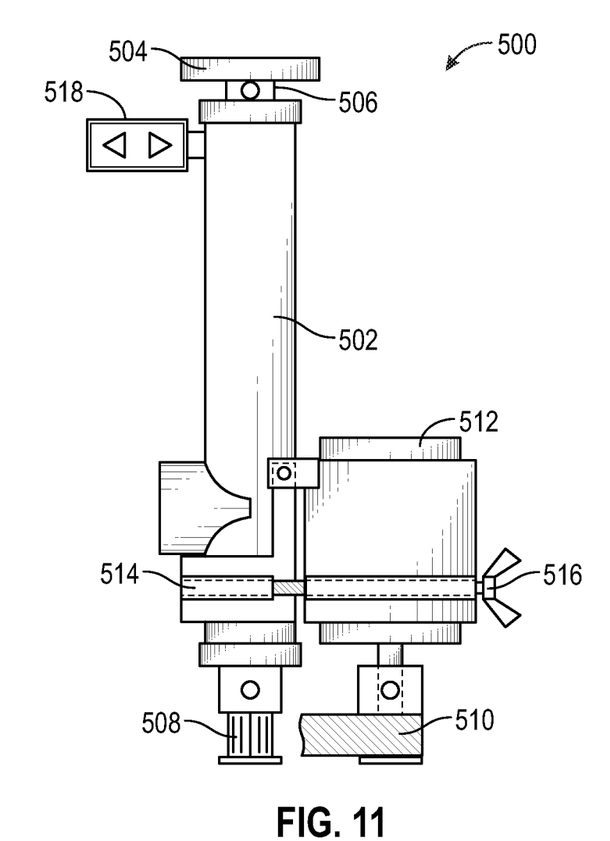

FIG. 11 shows a handle 500 in accordance with another embodiment of the present invention. Handle 500 includes a housing 502 encompassing a rod 504. Rod 504 presents a positioner 504 at one end and a connector 508 at another end. Connector 508 connects to a timing belt 510 that in turn connects to a motor 512. Motor 512 mounts to housing 502 via a connecting rod 514. Further, handle 500 includes a bell tensioner 516 for tightening or loosening timing belt 510 with respect to housing 502. In one example, housing 502 provides a toggle 518 for operating the motor 512 for tightening or loosening timing belt 510. Person skilled in the art understands that handle 500 operates in place of handle 404 to operate serving unit 400 in box-like structure 14 to serve the food product as explained above.

In operation, the diner operates toggle 518 which in turn operates motor 512 to move food holder 408 left or right within the box-like structure 14. Here, operating toggle 518 turns connector 508. In turn, the connector 508 engages timing belt 510. Timing belt 510 connects to food holder 408 and moves food holder 408 left or right within box-like structure 14. As explained above, the diner holds housing 502 to slide or move axle 402 along slots 28. Additionally, the diner rotates housing 502 to lift or dispense food product with the help of food holder 408.

In the embodiments described above, a diner operates the wheel (i.e., first wheel or second wheel) or handle to move the axle along slots and rotate to lift/pickup and dispense the food product in a plate placed at a corner of box-like structure. Person skilled in the art understands that the diner operates the wheel or handle manually to lift and serve the food product without coming in contact with the food product or the food holder. This ensures that there is no contact by the diner with the food product and/or the food holder placed within the box-like structure. Further, when the diner stands next to the box-like structure, droplets exerted or the air the diner breathes falls on the box-like structure and does not reach the food product or the food holder. This ensures the food product and the food holder do not get contaminated with the air the diner breathes or droplets exerted from the diner. The presently disclosed buffet serving apparatus ensures that next diner worries less about coming in contact with surfaces or products touched by other diners. In one example, outer surface of box-like structure and/or wheel or level allows for disinfecting without affecting/contacting the food product and food holder after each diner serves food product based on the above description. This further ensures that the diners feel safe to dine during the times of infectious disease outbreaks such as COVID-19.

In one example, each diner operates the serving unit to serve the food product. In another example, a staff member of a restaurant operates the serving unit to serve the food products to multiple diners reducing the risk of contamination from multiple diners contacting/touching the wheel or handle to operate the serving unit.

Figure 12A:
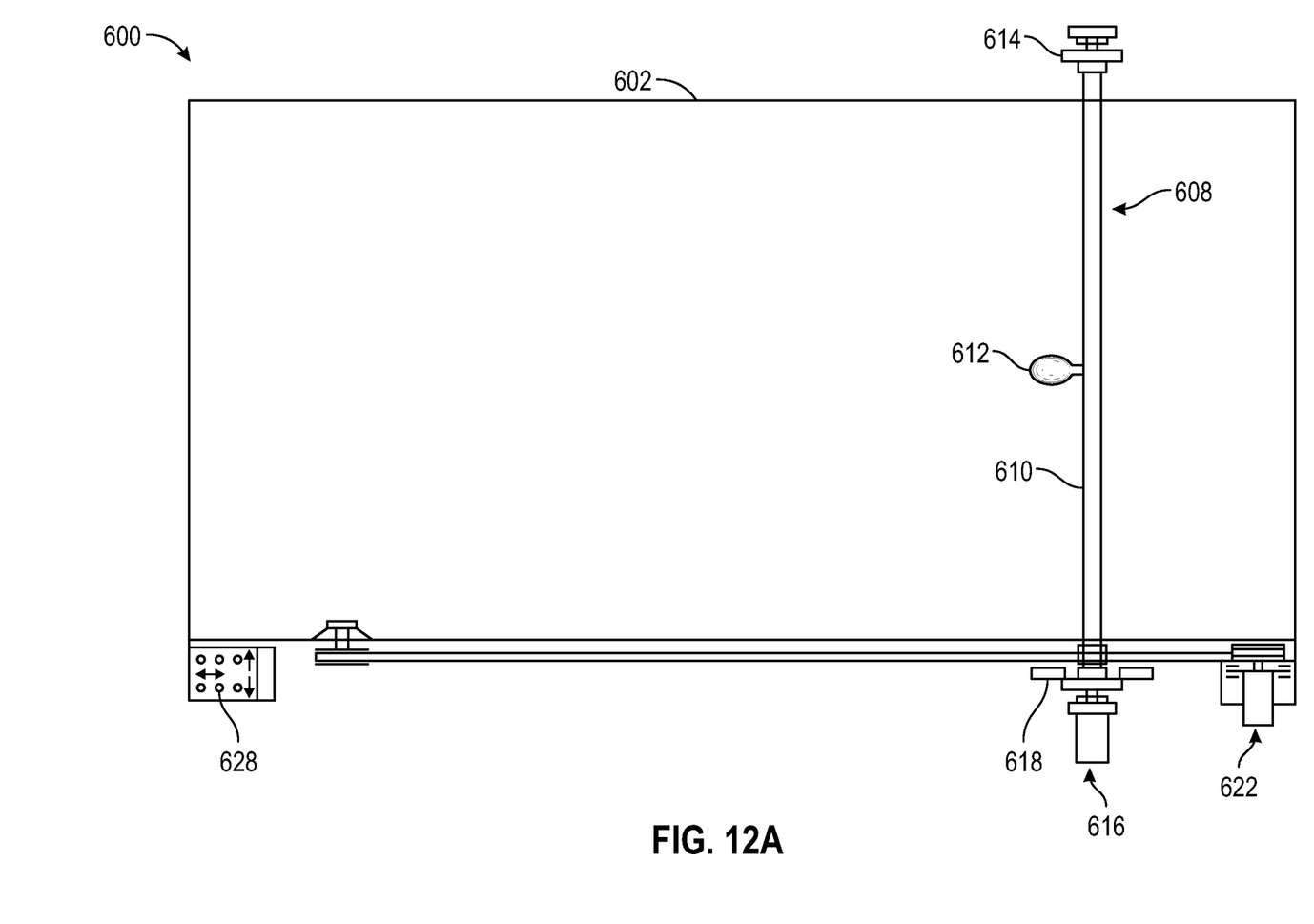
FIGS. 12A through 12E illustrate features of a buffet serving apparatus, in accordance with another embodiment of the present invention.
Figure 12B:
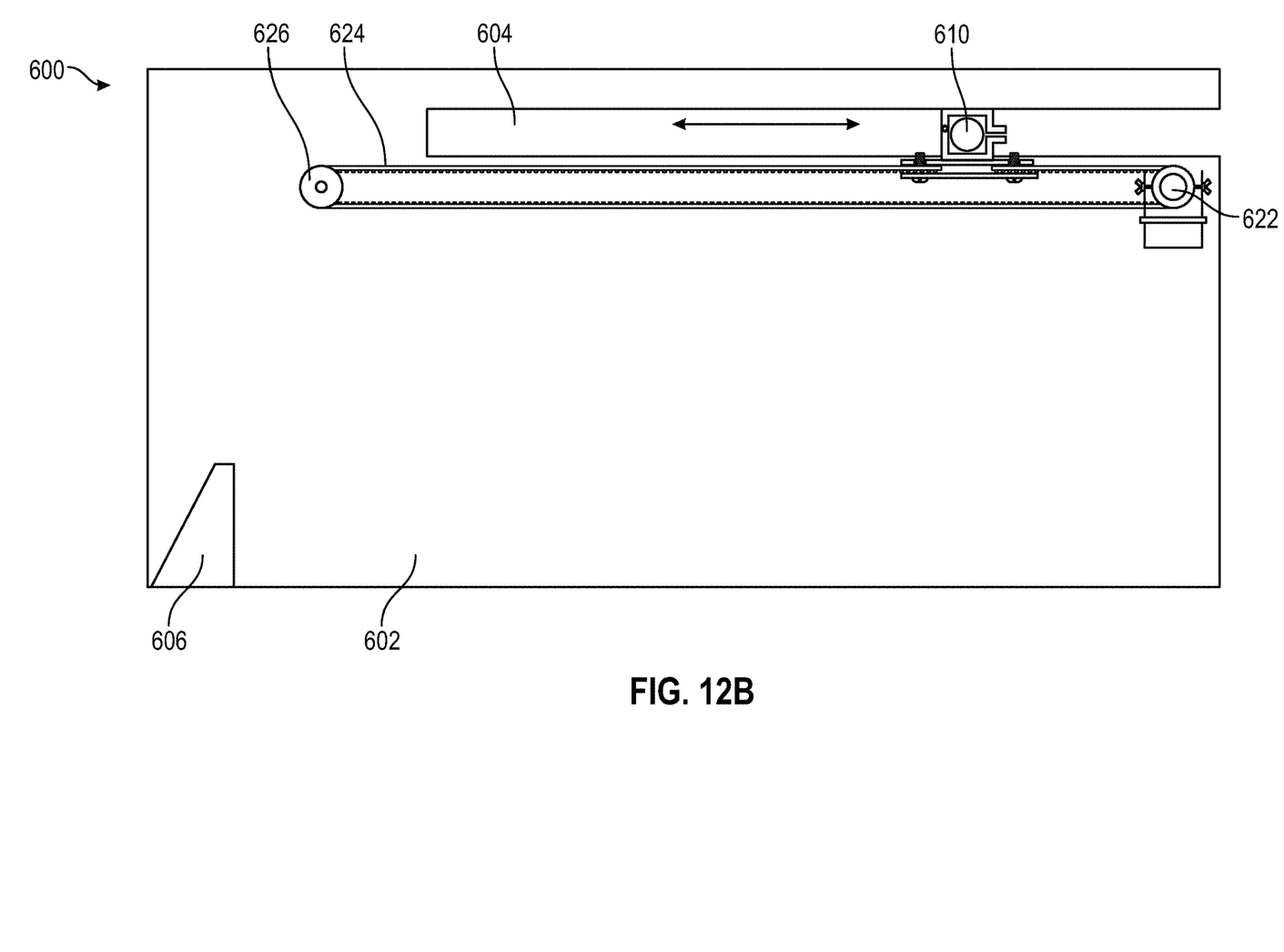
Figure 12C:
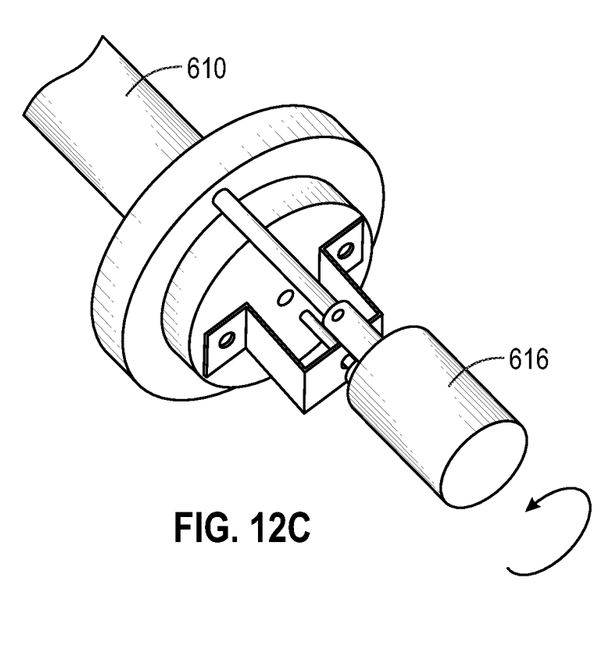

In one embodiment, the presently disclosed buffet serving apparatus operates automatically without the need for the diner to hold the wheel (i.e., first wheel or second wheel) or handle to move the axle along slots and rotate the axle to lift/pickup and serve the food product using the food holder. FIGS. 12A and 12B show a top view and a side view, respectively of a buffet serving apparatus 600 that operates with the help of motors, in accordance with one embodiment of the present invention. Buffet serving apparatus 600 includes a box-like structure 602 (similar to box-like structure 14). Box-like structure 602 encompasses slots 604 at its sides (similar to slots 28). Further, box-like structure 602 encompasses a cut-section 606 (similar to cut-section 24) at the front for receiving a plate (not shown, similar to plate 46). In the current embodiment, buffet serving apparatus 600 includes a serving unit 608. Serving unit 608 presents an axle 610 (similar to axle 32). Axle 610 provides a food holder 612 such as a spoon for lifting and serving food products (not shown).

Figure 12D:
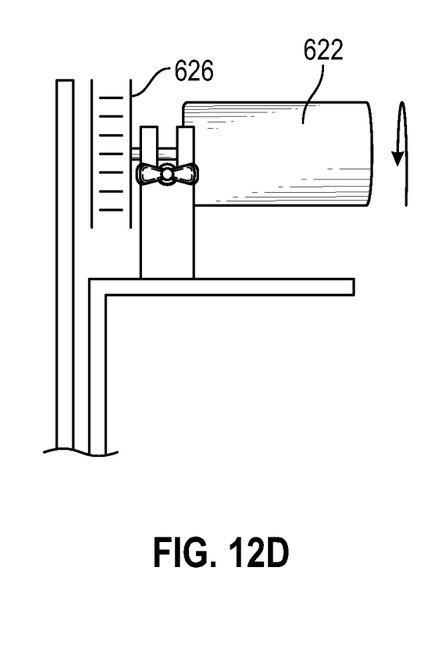
Figure 12E:
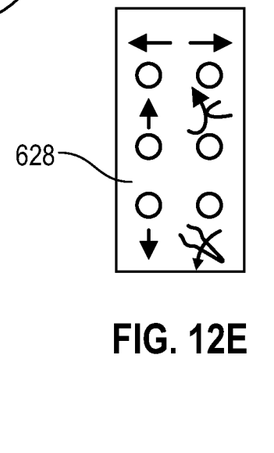

In the current embodiment, axle 610 provides a first wheel 614 at the ends. First wheel 614 includes a first motor 616 (FIG. 12C) operated with the help of two relays 618. One relay 618 helps to raise and lower food holder 612, and other relay 618 allows to engage the lever (e.g., lever 114) to close food holder 612 when used. First motor 616, when activates moves food holder 612 left or right along axle 610. Further, buffet serving apparatus 600 includes a second motor 622 configured for operating a belt 624 that allows axle 610 to travel through the slots 604. Belt 624 operates via rollers 626 that operates via second motor 622. FIG. 12D shows a side view of second motor 622 connecting rollers 626. In one example, buffet serving apparatus 600 includes a control board 628 having a variety of buttons allowing a diner to control the movement and rotation of axle 610. FIG. 12E shows a top view of control board 628, in accordance with one embodiment of the present invention. Here, the diner the operates control board 628 to control the speed at which axle 610 travels along the slots 604 and angle at which the axle 610 rotates to lift or dispense food products.

Although it is explained that the diner operates control board 628 to control the speed at which axle 610 travels along the slots 604 and angle at which the axle 610 rotates to lift or dispense food products, person skilled in the art appreciates that relay 618 may be preprogramed or preconfigured to trigger and operate at a predefined speed and at a certain angle to automatically move axle 610 along slots 604 and rotate to pick up and dispense food product in a plate. Here, relay 618 may be preprogramed to operate upon detecting presence of a diner in proximity to box-like structure 602 with the help of a proximity sensor (not shown). In one example, the relay 618 configures to operate at a predetermined time intervals say, once in 30 seconds to increase time and distance between consecutive diners approaching the buffet serving apparatus 600 to serve food product in their plates. This feature helps to avoid use of a staff member to operate the serving unit to serve the food products to multiple diners. This way, the presently disclosed buffet serving apparatus allows the diners to dine without having to worry about coming in contact with contaminated food product, infected people and/or equipment in a restaurant. After use, each of the components may be uninstalled for cleaning or washing either by hand or dishwasher. It is preferable to mount motors using removable connectors such as fasteners. This helps to remove the motors for cleaning other components.

The presently disclosed buffet serving apparatus allows for use in restaurants serving buffet. However, person skilled in the art understands that restaurants serving à la carte menu may also adopt the presently disclosed buffet serving apparatus to serve different food products. Further, the presently disclosed buffet serving apparatus allows for modification to components for use in picking up and dispensing food products including, but not limited to, cooked food, fruits, vegetables, cut fruits and vegetables, bakery products, pizza, grilled food, barbeque, etc.

A person skilled in the art appreciates that the buffet serving apparatus may come in a variety of shapes and sizes depending on the need and comfort of the diner. Further, different materials in addition to or instead of materials described herein may also be used and such implementations may be construed to be within the scope of the present invention. Further, many changes in the design and placement of components may take place without deviating from the scope of the presently disclosed buffet serving apparatus.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless a routine under taking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. A buffet serving apparatus, comprising:
    a box-like structure comprising slots, wherein said box-like structure receives a container holding a food product; and
    a serving unit comprising an axle, wherein said axle connects to a food holder, and wherein said slots receive said axle, and wherein said food holder moves left or right along said axle,
    wherein said axle moves along said slots, and wherein said axle rotates in one direction to pick up the food product from said container using said food holder and rotates in opposite direction to dispense the food product from said food holder.

2. The buffet serving apparatus of claim 1, wherein said box-like structure is made of a transparent material.

3. The buffet serving apparatus of claim 1, wherein said axle comprises at least one wheel positioned outside said box-like structure, and wherein said at least one wheel allows for moving said axle along said slots and rotating said axle to pick up and dispense the food product using said food holder.

4. The buffet serving apparatus of claim 1, wherein said axle comprises a first wheel and a second wheel, wherein said first wheel rotates said axle to pick up and dispense the food product from said container, and wherein said second wheel moves said axle along said slots.

5. The buffet serving apparatus of claim 1, wherein said box-like structure comprises a cut-section for receiving a plate, and wherein said food holder dispenses the food product into the plate.

6. The buffet serving apparatus of claim 1, wherein said food holder is one of a spoon, a ladle and a food tong.

7. The buffet serving apparatus of claim 1, wherein said axle comprises a lever for controlling angle of rotation of said food holder via said axle.

8. The buffet serving apparatus of claim 7, wherein said food holder is a food tong, and wherein said food tong comprises arms for holding the food product.

9. The buffet serving apparatus of claim 8, wherein said food tong comprises a scissor mechanism connecting said arms, and wherein said lever engages said scissor mechanism for bringing closer or separating said arms for picking up or releasing the food product, respectively.

10. The buffet serving apparatus of claim 1, wherein said axle comprises a handle, wherein said handle allows moving said axle along said slots and rotating said axle to pick up and dispense the food product using said food holder.

11. The buffet serving apparatus of claim 10, wherein said handle comprises a rod connecting a positioner, wherein said rod connects to a connector, wherein said axle comprises a timing belt connecting said connector and a tension spring, wherein said food holder connects to said timing belt and said tension spring, and wherein said positioner rotates to engage said connector via said rod and allows for contracting or expanding tension on said tension spring to move said food holder sideways within said box-like structure.

12. The buffet serving apparatus of claim 10, wherein said handle comprises a rod connecting a positioner and a toggle, wherein said rod connects to a connector, wherein said axle comprises a timing belt connecting said connector and a tension spring via a motor, wherein said food holder connects to said timing belt and said tension spring, and wherein said toggle operates to engage said motor for contracting or expanding tension on said tension spring to move said food holder sideways within said box-like structure.

13. A buffet serving apparatus, comprising:
- a box-like structure comprising slots, wherein said box-like structure receives a container holding a food product;
- a serving unit comprising an axle, wherein said axle connects to a food holder, and wherein said slots receive said axle and wherein said food holder moves left or right along said axle; and
- a motor connecting said axle at outer side of said box-like structure,
- wherein said motor engages said axle to move along said slots, and wherein said motor further engages said axle to rotate in one direction to pick up the food product from said container using said food holder and rotate in opposite direction to dispense the food product from said food holder.

14. The buffet serving apparatus of claim 13, wherein said motor comprises at least one relay for controlling the speed of axle moving along said slots.

15. The buffet serving apparatus of claim 14, further comprises a control board for controlling operation of said motor and said at least one relay.

16. The buffet serving apparatus of claim 13, further comprises a belt, and wherein said axle comprises wheels configured for moving along said belt with the help of said motor.

17. The buffet serving apparatus of claim 16, further comprises rollers connecting said belt, and wherein said rollers facilitate movement of said belt.

18. The buffet serving apparatus of claim 17, wherein said rollers comprise a second motor facilitating movement of said belt.

19. A method of providing a buffet serving apparatus, said method comprising steps of:
- providing a box-like structure comprising slots, said box-like structure configured for receiving a container holding a food product;
- providing a serving unit having an axle, said axle connecting a food holder, said axle comprising a tension spring that extends or contracts facilitating the food holder to move left or right along the axle within the box-like structure;
- receiving said axle through said slots;
- rotating said axle in one direction for picking up the food product from said container using said food holder;
- moving said axle along said slots while holding the food product with said food holder; and
- rotating said axle in opposite direction for dispensing the food product from said food holder.

20. The method of claim 19, wherein rotating and moving said axle is performed manually or using a motor.

\* \* \* \* \*